S. B. ATWOOD.
DOOR BUMPER.
APPLICATION FILED JUNE 19, 1920.
1,353,506. Patented Sept. 21, 1920.
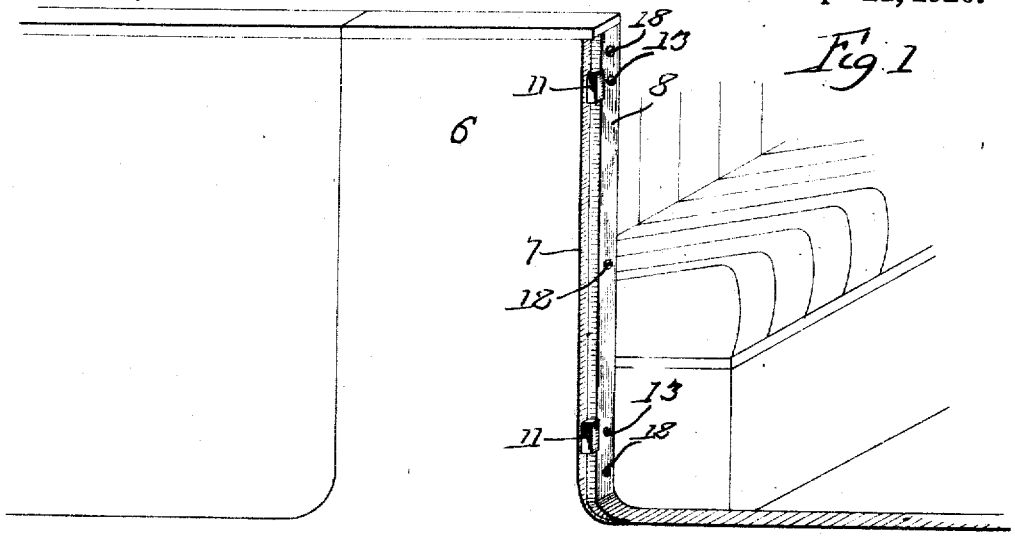
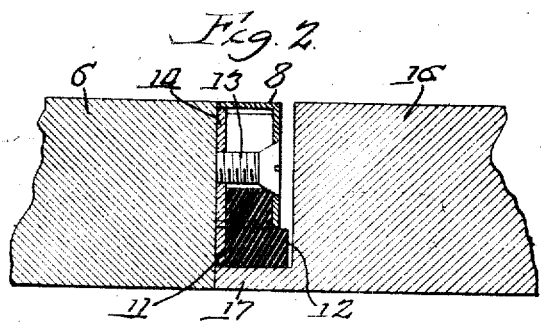
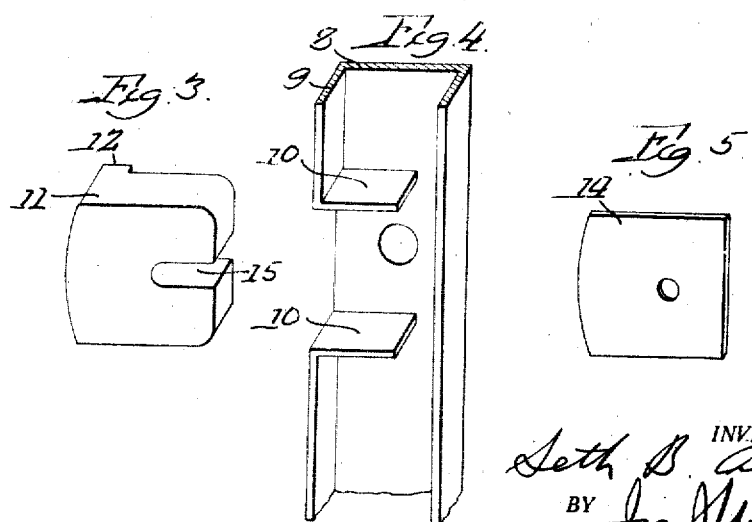
INVENTOR.
Seth B. Atwood
BY Ira J. Wilson
ATTORNEY.

UNITED STATES PATENT OFFICE.

SETH B. ATWOOD, OF ROCKFORD, ILLINOIS.

DOOR-BUMPER.

1,353,506.   Specification of Letters Patent.   Patented Sept. 21, 1920.

Application filed June 19, 1920. Serial No. 390,205.

*To all whom it may concern:*

Be it known that I, SETH B. ATWOOD, a citizen of the United States, residing at Rockford, in the county of Winnebago and State of Illinois, have invented certain new and useful Improvements in Door-Bumpers, of which the following is a specification.

This invention relates in general to door bumpers, and while capable of application to various types of doors, is particularly adaptable for automobile doors.

One of the primary purposes of my present invention is to provide a door bumper of the character indicated, which can be economically manufactured and readily assembled.

Another object is to provide a bumper which *per se* will form the door strip of the door casing, thereby obviating the necessity of the usual door strip with which car bodies are customarily equipped.

A further feature of my invention resides in the provision of a bumper, in which none of the metal is cut away, but on the contrary, all of the metal is retained in the bumper construction to add strength and rigidity to the structure, as well as to afford provision for holding the bumper block in position. It will be manifest that losses in the manufacture of bumpers resulting from scrap material, are obviated by my improved construction.

Various other objects and advantages of my invention will be readily appreciated as the same becomes better understood by reference to the following description when considered in connection with the accompanying drawings.

Referring to the drawings:

Figure 1 is a fragmentary perspective view of an automobile body, equipped with my invention;

Fig. 2 is a transverse sectional view through one of my improved bumpers; and

Figs. 3, 4 and 5 are detail perspective views of the bumper block, the channel shaped member and clamping plate respectively.

Referring to the drawings more in detail, reference character 6 indicates generally the body of an automobile provided with the usual door casing 7. This body may be of any approved construction, but my invention is particularly adaptable for use in connection with all metal bodies, which are being quite extensively manufactured.

In the construction of both wood and metal bodies, it has heretofore been customary to provide a door strip along the vertical side of the door casing, against which the door is adapted to close, rattling between the strip and the door being prevented by the interposition of rubber bumpers of various characters. My present invention contemplates the elimination of the ordinary door strip and the substitution therefor of a combined door strip and bumper, so that the whole structure can be economically manufactured and quickly and easily assembled and connected to the car body.

With this desideratum in view, I have provided a member 8 of channel shaped construction, which is shaped to conform to the contour of the door casing. In the body shown for purposes of illustration, the vertical wall of the casing is substantially straight, but in many bodies, it is more or less curved, particularly near the lower end thereof and in the application of my invention to such a body, the member 8 is similarly curved so that it will conform to and fit snugly against the face of the door casing.

Intermediate its ends, preferably at two points, the outer flange of the member 8 is severed transversely and also for a short distance at each side of this cut along its juncture with the transverse web of the channel member. These severed tongues 10 are then bent inwardly so as to be disposed in approximately parallel relation transversely of the channel. It will be observed that the formation of these guides by bending inwardly the metal of the flange 9, provides an open ended guide-way extending transversely of the channel member without cutting out and scrapping any of the metal, so that losses incident to scrap metal are obviated.

Within each guideway formed as above explained, I dispose a bumper block 11, made of resilient material such as rubber. This block throughout its body portion, is slightly narrower than the depth of the flanges of the channel shaped member and at its outer end, it is provided with a lateral extension 12 adapted to project outwardly beyond the face of the transverse web of the channel shaped strip, as will be evident from Fig. 2. When the block has been positioned in the channel, it is held therein by a screw 13 inserted into the channel through the transverse web thereof and threadedly engaged at its inner end with a clamping plate 14 which is disposed against the inner face of the block 11. To accommodate this screw, the block 11 is provided with a transverse opening 15 through which the screw extends, and preferably, this opening is in the form of a slot which will permit longitudinal adjustment of the bumper block when the screw is loosened, thereby permitting the block to be adjusted to take up for wear. The door of the body is indicated generally by reference character 16 and from Fig. 2, it will be observed that a flange 17 formed on the outer edge of the door, overlaps the bumper block and provides the abutment surface, which prevents rattling.

It will be observed that the channel shaped member 8 serves the purpose of the ordinary door strip, and in addition thereto, carries the bumper blocks which can be attached to the strip before the strip is connected to the body. The strip having been formed to provide the guideways for the bumper blocks, as explained, the blocks are inserted in position, the plates 14 are disposed against the inner faces of the blocks whereupon the insertion of the screws 13 connects the blocks to the strip and holds them in position so that the strip carrying the blocks can then be attached to the door frame by screws 18, or other preferred fastening means. After the bumpers have been in use for some time and have become compressed or worn down, they may be adjusted to insure the requisite fit between the door and the casing by simply loosening the screws 13 and adjusting the blocks to any desired position.

It will be observed that this construction is strong and durable, that it can be economically manufactured without waste of material, that it can be easily assembled and applied to a door casing, that it eliminates the ordinary door strip, and that it effectually prevents rattling of the doors. While I have shown and described a preferred embodiment of my invention, it should be understood that it is capable of considerable modification in its details without departing from the spirit of the invention, as defined in the following claims.

I claim:

1. A door bumper, comprising a channel shaped member having one flange cut and bent inwardly on opposite sides of said cut to provide a pair of transversely extending guides within the channel, a resilient bumper block positioned between said guides and projecting outwardly between the plane of said flange, a plate disposed against the inner face of said block, and means for clamping said block between said plate and the transverse web of said member.

2. In a bumper for automobile doors, the combination of a channel shaped member formed to fit and adapted for attachment to an automobile door casing to provide the door strip therefor, said member having a portion of one flange bent inwardly to provide transverse guides, a resilient bumper block positioned between said guides, and means for adjustably holding said block in position on said member.

3. A bumper for automobile doors, comprising a channel shaped member formed to fit a door casing and adapted to be attached thereto to provide the door strip, the outer flange of said strip being cut and bent inwardly to provide guides extending transversely of the channel, a resilient bumper block disposed in said channel between said guides and projecting outwardly beyond the plane of the face of said flange, and means for clamping said block in position.

SETH B. ATWOOD.